United States Patent [19]

Bouloutas et al.

[11] Patent Number: 5,309,448
[45] Date of Patent: May 3, 1994

[54] METHODS AND SYSTEMS FOR ALARM CORRELATION AND FAULT LOCALIZATION IN COMMUNICATION NETWORKS

[75] Inventors: Anastasios T. Bouloutas, Athens, Greece; Seraphin B. Calo, Peekskill; Allan J. Finkel, New City, both of N.Y.

[73] Assignee: International Business Machines Corporation, Armonk, N.Y.

[21] Appl. No.: 817,011

[22] Filed: Jan. 3, 1992

[51] Int. Cl.$^5$ ............................................. G01R 31/28
[52] U.S. Cl. .................................. 371/29.1; 370/13; 340/825.16
[58] Field of Search ............... 371/29.1, 20.1; 370/13; 340/825.16

[56] References Cited

U.S. PATENT DOCUMENTS

| | | | |
|---|---|---|---|
| 4,387,456 | 6/1983 | Creteau | 370/13 |
| 4,530,085 | 7/1985 | Hamada et al. | 370/15 |
| 4,601,028 | 7/1986 | Huffman et al. | 370/15 |
| 4,685,102 | 9/1987 | Lewis | 370/15 |
| 4,697,268 | 9/1987 | Desyllas et al. | 371/67 |
| 4,710,926 | 12/1987 | Brown et al. | 371/9 |
| 4,745,597 | 5/1988 | Morgan et al. | 370/87 |
| 4,815,069 | 3/1989 | Nakayashiki et al. | 370/16 |
| 4,881,230 | 11/1989 | Clark et al. | 371/20.1 |
| 4,907,227 | 3/1990 | Unno | 371/11.2 |
| 4,997,390 | 12/1990 | Saylor et al. | 340/521 |
| 5,189,674 | 2/1993 | Shimizu | 371/20.1 |

FOREIGN PATENT DOCUMENTS 61-193535 8/1986 Japan.
1-236850 9/1989 Japan.
2-148951 6/1990 Japan.

OTHER PUBLICATIONS

Bouloutas, Anastasios T., "Modeling Fault Management in Communication Networks", Columbia University Thesis, 1990.
Bucknell et al., "Method for Table-Driven Dynamic Event Notification", IBM Technical Disclosure Bulletin, vol. 32, No. 3A, pp. 45-52, 1989.
Combes et al., "Automatic Analysis of Error Records in a Communication Controller for Optimum Maintenance", IBM Technical Disclosure Bulletin, vol. 31, No. 6, pp. 138-141, 1988.

*Primary Examiner*—Charles E. Atkinson
*Attorney, Agent, or Firm*—Heslin & Rothenberg

[57] ABSTRACT

An approach for modeling and solving the problem of fault localization and alarm correlation in large communication networks is presented. Specifically, a new alarm structure is presented along with a general model for representing a communications network. Several specific processing algorithms are provided for solving alarm correlation and fault localization problems in the presence of one or more faults. These algorithms differ in the degree of accuracy achieved in locating a fault, and in the degree of complexity required for implementation.

22 Claims, 7 Drawing Sheets fig. 1 fig. 2 fig. 3 fig. 4a fig. 4b fig. 4c fig. 5 fig. 6 fig. 7 fig. 8

METHODS AND SYSTEMS FOR ALARM CORRELATION AND FAULT LOCALIZATION IN COMMUNICATION NETWORKS

TECHNICAL FIELD

The present invention relates in general to alarm processing, and more particularly, to method and systems for correlating alarms and locating faults in communication networks using preexisting alarm sets which provide only limited fault identification information.

BACKGROUND ART

Telecommunication networks have increased dramatically in size and complexity in recent years. A typical network may consist of hundred of nodes, with network equipment being supplied by numerous manufacturers, each with different traffic and bandwidth requirements. This increase in complexity presents serious problems of network management and control. One aspect of network management is fault management, and an essential component of fault management is fault identification. Unfortunately, failures in large communication networks are normally unavoidable; yet quick detection and identification of the cause of failure can make a communication system more robust, and its operation more reliable. However, when a fault occurs in a network, an operator is often overwhelmed with messages, making fault localization a difficult task. Too much information has the same effect as too little information, i.e., fault identification is made more complex.

Since communication networks typically consist of devices independently manufactured by different vendors, the internal implementation of these devices commonly varies. (But the interface of each device with the rest of the network is standardized to conform to widely accepted standards (e.g., SNA, ISO, etc.)). Thus, each network device is typically independently designed. The designer of a communication system device usually ensures that both the device and its perceived interface, i.e., the rest of the network projected into the device's observation space, are working correctly. A natural design process includes designing alarms for the various fault conditions that the device may encounter when in operation. Thus, a device designer typically provides two types of alarms: (1) alarms for faults that exist within a device; and (2) alarms for faults that appear at the interface with which the device has to conform.

A fault within a device may disrupt its operation as well as its behavior towards other devices. This may cause many network devices to emit alarms indicating problems with their interfaces. (Traditionally, a device alarm consists of a text string and possibly a unique alarm identifier.) Thus, the system administration can become overwhelmed with alarms generated from the same basic problem. Even though in the abstract it may appear that more information assists in diagnosing a problem, in reality it may not be so. Usually alarm messages do not carry the explicit information needed to diagnose a fault. Rather, alarms typically describe in detail the faulty condition, i.e., the symptom of the fault. They do not normally describe the cause of the fault.

With a multitude of alarms, it can be difficult to:

(1) localize a fault. In most cases alarms do not explicitly indicate the location of a fault. An analysis of the emitted alarms must be performed to pinpoint the problem area of the network.

(2) correlate alarms. It is difficult for a human operator or even a software program to examine the hundreds of alarms which may occur substantially simultaneously in a network and assign those alarms to one or more particular fault conditions.

The present invention seeks to address these problems. Specifically, methods and systems are provided which examine emitted alarms, and the topology of a telecommunications network, to localize the area of the network where a fault has occurred and to correlate received alarms with one or more faults within the network.

DISCLOSURE OF INVENTION

Briefly summarized, one aspect of the present invention comprises a method for identifying a fault in a communications network having a plurality of devices connected therein. At least some of the devices are configured to respond to a perceived fault in the network by presenting an alarm. The method includes the steps of: identifying multiple activated alarms in the network, each alarm being emitted by a corresponding one of the devices connected within the communications network, and each alarm indicating only knowledge of the corresponding device state or the corresponding device interface state; assigning to each identified alarm at least one primitive from a plurality of predefined primitives, each assigned primitive indicating a relative fault location within the network with respect to the corresponding device; mapping each alarm with its assigned primitive(s) to a representative portion of the network, the mapped portion corresponding to the relative fault location indicated by the assigned primitive(s), wherein a set of possible fault locations is defined for each alarm; and using the defined fault location sets to determine a possible location of an actual fault in the network. Specific processing algorithms for identifying possible fault locations are presented and claimed herein. In addition, various systems implementing the described methods are disclosed.

Generalized fault-identification and alarm-correlation methods and systems for networks (such as communication networks) are presented herein. Most of the methods and systems are capable of identifying multiple simultaneous faults, in addition to introducing a natural separation of the expert knowledge (i.e., the fault locations indicated by each alarm) and the algorithms used, with an important contribution being alarm modeling and the presented algorithms. Further, the processing approach is capable of handling unreliable alarms and a method and system which can be easily adopted to a dynamic network are described.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

As noted, telecommunication networks normally consist of devices from many different manufacturers. A typical network may include modems, encrypters, CSUs, IDNXs, telecommunication lines and other devices. Telecommunication devices are designed to work within layers of a communications protocol (e.g., TCP/IP, SNA, OSI). These devices may either transmit an alarm signal, e.g., to a central control room, or provide an appropriate alarm signal in a register to be polled by a central controller. Those skilled in the art will recognize from the following discussion that the present invention applies to either technology.

A telecommunications device may emit an alarm when a threshold is exceeded or when a device detects an internal problem or a problem at its interface. The network device knows nothing of the topology of the telecommunications network, and a single fault in a telecommunications network may disrupt the operation of many devices, such that multiple alarms may be emitted based thereon. Correlating these alarms and diagnosing the location of a fault is a difficult task whether directed by a human operator or a computerized machine. The present invention comprises an automated communications network management technique to assist in this task.

Presently, communications network management is usually manually coordinated. An operator in a central control room monitors a console and makes decisions based on alarms displayed and/or user complaints. The console is typically either a 3270 IBM protocol or ASCII display. (Again a single fault may result in literally hundreds of alarms being generated and displayed.) Multiple consoles are common and there is typically a separation between the physical network and the logical network.

An ideal alarm might give the following information:

who: The name of the device (or system) experiencing the fault.

What: The condition of the fault, i.e., the symptom of the fault.

Where: The position in the network where the problem has occurred.

When: The time the problem was detected.

Why: The cause of the problem, i.e., the nature of the fault.

If provided with the above information, an operator or automated management system could quickly correlate multiple alarms and locate the responsible fault or faults. Unfortunately, the information described is usually not provided by the conventional alarms of any communication system device since each device in a communication network knows only limited information about the rest of the system. Most alarms emitted by network devices report only the device that is experiencing the fault, the nature of the fault and the time of the detection of the fault, i.e., answer the questions, who, what and when. However, for the purpose of fault identification and alarm correlation more is need, i.e., answers to the questions where and why. Pursuant to the present invention, implicit fault-localization information is associated with each generated alarm within the communications network.

Most alarms do not include fault-localization information because the location of the fault is not known precisely by the device emitting the alarm. However, almost every alarm does contain implicit fault-localization information. For example, consider the alarm "LOS-DTE" emitted by a channel service unit (CSU). This alarm indicates a loss of the signal from the data-terminal-equipment side of the CSU, and not from the side connected to the T-1 transmission line. The alarm, even if it does not indicate a specific location for the fault, therefore restricts the possible locations of the fault to a smaller part of the network. In similar fashion, a bipolar violation, or BPV (i.e., an alarm emitted by a CSU), is an alarm that indicates a problem with the transmission line and not with the CSU. This alarm restricts the possible locations of the fault to locations outside of the CSU.

Thus, each vendor-provided alarm can be associated with a set of possible locations representing the locations of the fault. Note that the present invention proposes to associate each alarm with all of the possible locations of the fault, not only with the most probable ones. In the case where alarms are reliable and there is only a single fault in the network, fault localization is straightforward. Specifically, the fault lies in the intersection of the set of locations indicated by each alarm. Thus, intuitively, alarms which share a common intersection should be correlated.

Before defining an algorithm for alarm correlation (and fault localization), however, the term "incident" needs to be defined. An incident is used herein to refer to a set of correlated alarms. Ideally, an incident should contain all of the alarms attributed to the same fault. Any incoming new alarm can cause the creation of a new incident, the association thereof with an existing incident, or a totally new reorganization of incidents. This is because a new alarm may make a new hypothesis of faults more probable.

Thus, incidents can be opened and closed. The creation of an incident is triggered by the arrival of an alarm. However, the deletion of an incident is more complex. An incident should be deleted (closed) when the faulty condition that caused generation of the alarms corresponding to the incident ceases to exist. For simplicity, the responsibility of testing and closing an incident is assumed to be assigned to a network operator. (In certain cases, a timing controller could alternatively be used to close incidents.) Other, appropriate testing techniques will be apparent to those skilled in the art.

Figure 1:
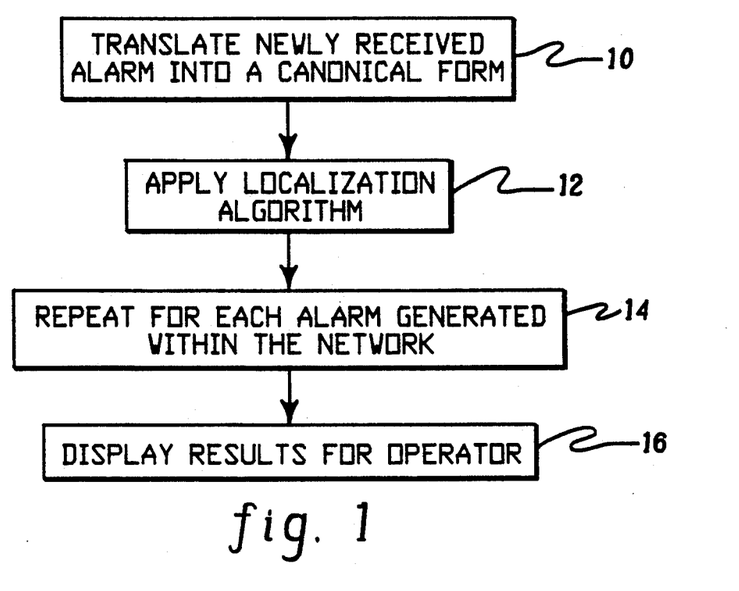
FIG. 1 is a functional overview of one alarm correlation and fault identification method pursuant to the present invention.

A generalized overview of a processing method pursuant to the present invention is provided in FIG. 1. As shown, each received alarm is associated with explicit fault-localization information, 10 "Translate Newly Received Alarm Into A Canonical Form." An alarm is associated with a set of locations representing all possible locations of the fault (possible faults). The information about the location of the fault may be associated with an alarm in a manner which is independent of network configuration. For example, one can associate the primitives described below (upstream, downstream, etc.) with each alarm. These primitives, if applied to a specific network configuration, can generate the set of possible faults. The set of possible faults comprises the fault localization information associated with each alarm.

In order to define the primitives associated with the alarms, the communications network must be modeled. In a preferred model, a communication network consists of a set of connections. Using this, one can define the connections of the communication network in a hierarchical fashion. Communication between two points "A" and "B" depends on the correct operation of the devices in "A" and "B" and on the channel in between. The correct operation of the channel depends on the devices comprising the channel. Thus, a natural hierarchy is formed. Each layer of this hierarchy provides services to the layer above. The physical transmission line lies at the bottom of the hierarchy. Thus, alarms emitted by a device in a specific layer usually distinguish whether the fault is in the layer above, the layer below, or internal or external to the device emitting the alarm. Using this, the following primitives are defined:

Upstream: The fault is located in the layer above the layer of the device emitting the alarm.

Downstream: The fault is located in the layer below the layer of the device emitting the alarm.

Interface: If yes, the fault is in the interface to the device emitting the alarm, otherwise the fault is in the device.

Range: Depending upon the device, the range of the fault may be more precisely defined than upstream, downstream, internal or external, e.g., fault in the peer device, or fault in the transmission line. Range provides the capability to have a narrower localization of the fault.

Once the primitives have been defined, assignment of a fault localization field to each alarm is straightforward. Given an alarm associated with the primitive describing the location of the fault and a representation of the possible faults, the set of faults that could have produced the alarm is identified. This set is referred to herein as the "fault localization field." The objective of the present invention is to present various methods that are able to best explain the appeared alarms using the information in the fault localization field of each alarm.

Continuing with FIG. 1, the next processing step is to apply a localization algorithm to the received alarms, 12 "Apply Localization Algorithm." As described further below, any one of several different algorithms pursuant to the present invention can be applied at this point. After localizing the fault or faults for a given set of alarms, processing steps 10 and 12 are repeated for each new alarm generated within the network, 14 "Repeat For Each Alarm Generated Within The Network," and the results may be displayed for an operator, 16 "Display Results For Operator."

Figure 2:
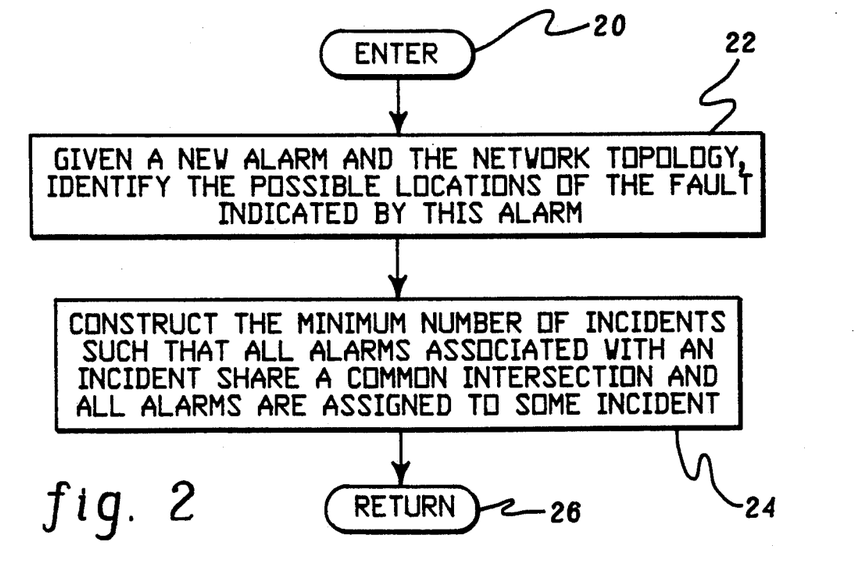
FIG. 2 is a functional diagram of a first localization algorithm embodiment for use in the processing flow of FIG. 1.

A first localization algorithm is outlined in FIG. 2. This approach is referred to herein as a "positive information algorithm." After entering the routine, 20 "Enter," the processor receives (or has previously generated) a new alarm, a set of incidents and their associated alarms, a description of the network topology, and the possible fault(s). From this information, the possible locations of the fault(s) indicated by the new alarm are identified, 22 "Given A New Alarm And The Network Topology, Identify The Possible Locations Of The Fault Indicated By The New Alarm." Thereafter, the processor constructs the minimum number of incidents such that all alarms associated with an incident share a common intersection and all alarms are assigned to some incident, 24 "Construct The Minimum Number of Incidents Such That All Alarms Associated With An Incident Share A Common Intersection And All Alarms Are Assigned To Some Incident." Thereafter, return is made to the main processing flow of FIG. 1, 26 "Return."

Minimization step 24 of the algorithm of FIG. 2 is important since incidents indicate faults. Correct association of alarms with incidents necessarily means correct fault localization. Thus, in this step the minimum number of incidents (and therefore faults) that can explain the appearance of a set of alarms is sought. The implicit assumption here is that it is more likely to have few faults than many faults. If there is a single fault to be identified, then the number of incidents is one and all alarms should have a common intersection since they are attributed to the same fault. Step 24 of the algorithm thus localizes the fault to the particular part of the network defined by the intersection of all the alarms.

In the case where alarms may participate in more than one intersection, the algorithm of FIG. 2 is inadequate. Further, the algorithm does not guarantee uniqueness. For example, given a set of alarms, there may be more than one way of constructing the minimum number of incidents (i.e., more than one way of proposing possible hypotheses of faults). By way of example, given three alarms from devices forming the vertices of a triangularly configured communication network, there may be cases in which the fault localization areas of the alarms can produce three unique intersections. Any combination of two intersections would be enough to define a minimum number of incidents. The choice of the best two is undetermined given the algorithmic approach of FIG. 2.

Figure 3:
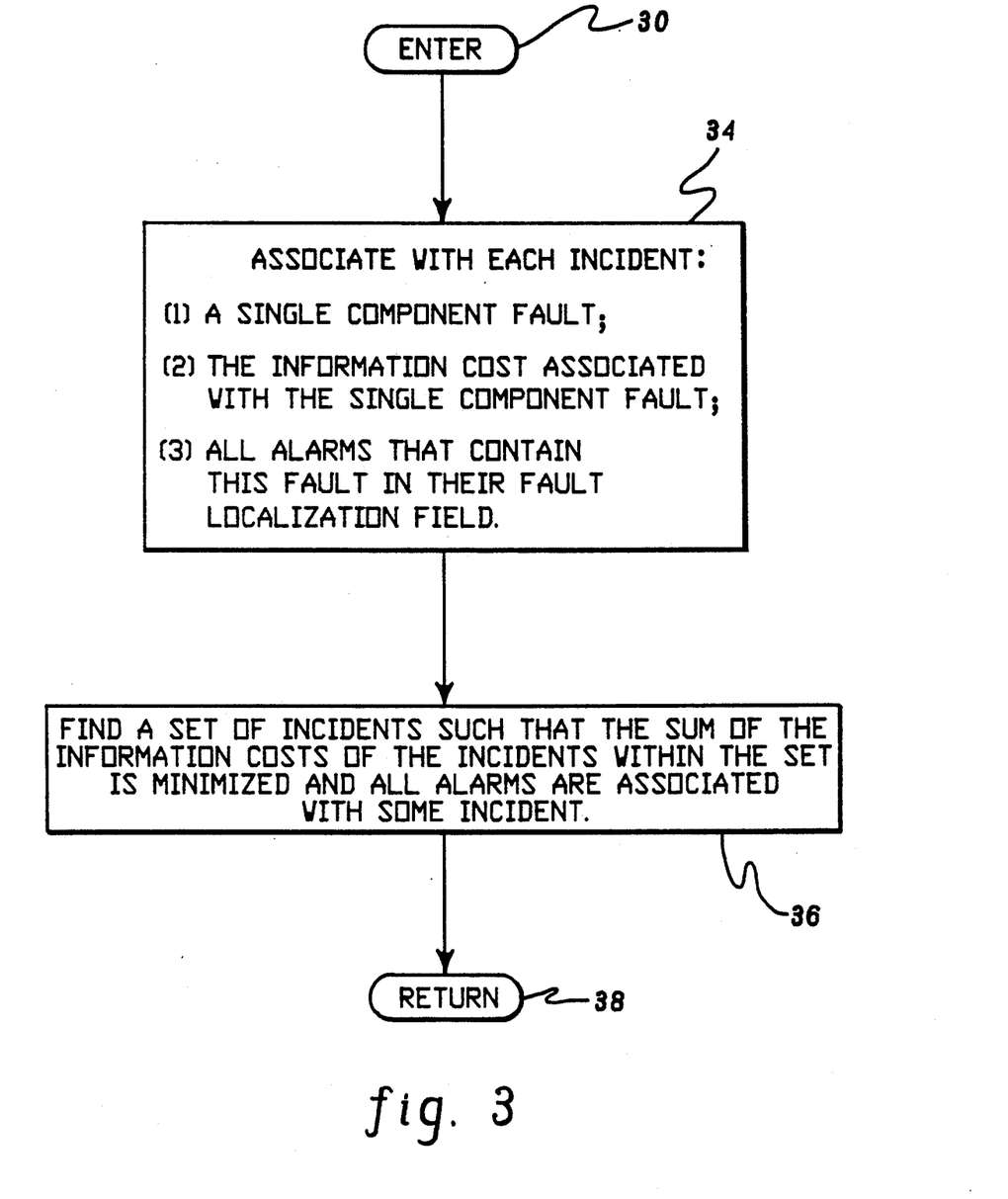
FIG. 3 is a functional diagram of a second localization algorithm embodiment for use in the processing flow of FIG. 1.

One way of resolving the problem is to associate a-priori probabilities of failure with each network component, thereby allowing the incidents containing the components most likely to fail to be chosen. Alternatively, instead of associating a probability of failure with each component, an "information cost" (i.e., the negative of the logarithm of the probability of failure) can be associated therewith. Even though information costs are equivalent to probabilities for independent faults, working with information costs instead of probabilities has certain advantages (such as their additive nature). Using this concept, step 12 of the processing flow of FIG. 1 can be refined as shown in FIG. 3.

Initially after entering the routine, 30 "Enter," processing is directed to associate each incident with: a single component fault; an information cost associated with the single component fault; and all alarms which contain the fault in their fault localization field; 34 "Associate With Each Incident: (1) A Single Component Fault; (2) The Information Cost Associated With The Single Component; and (3) All Alarms That Contain This Fault In Their Fault Localization Field." (Preferably, each element of the network is pre-associated with an "information cost" which identifies its likelihood of failure. As with the network configuration, this information comprises separately maintained supportive data which can be referred to as needed.) Thereafter, the set of incidents are identified such that the sum of the information costs of each incident within the set is minimized and all alarms are associated with some incident, 36 "Find A Set Of Incidents Such That The Sum Of The Information Cost Of The Incidents Within The Set Is Minimized And All Alarms Are Associated With Some Incident," after which return is made to the overview processing of FIG. 1, 32 "Return."

The method outlined above produces the most probable faults, i.e., the faults that best explain the observed alarms. Those skilled in the art will recognize that the problem of finding the set of incidents which minimize the information costs is unfortunately NP-Complete. As a solution, a heuristic algorithm which approximates the optimal solution (and in simple cases finds it) can be used. In such an algorithm, the fault with the minimum "relative weight" (i.e., the information cost of the fault divided by the number of alarms whose localization fields include the fault) with respect to the set of alarms received is chosen. All alarms that contain this fault in their fault localization field are then discounted. The choosing step is then repeated with respect to the reduced set of alarms on hand. Those skilled in the art will recognize that this algorithm represents only one of the possible approaches to solving the computing problem associated with the step 36 processing of FIG. 3. Other approaches may also be suitable depending upon the particular application.

Figure 4A:
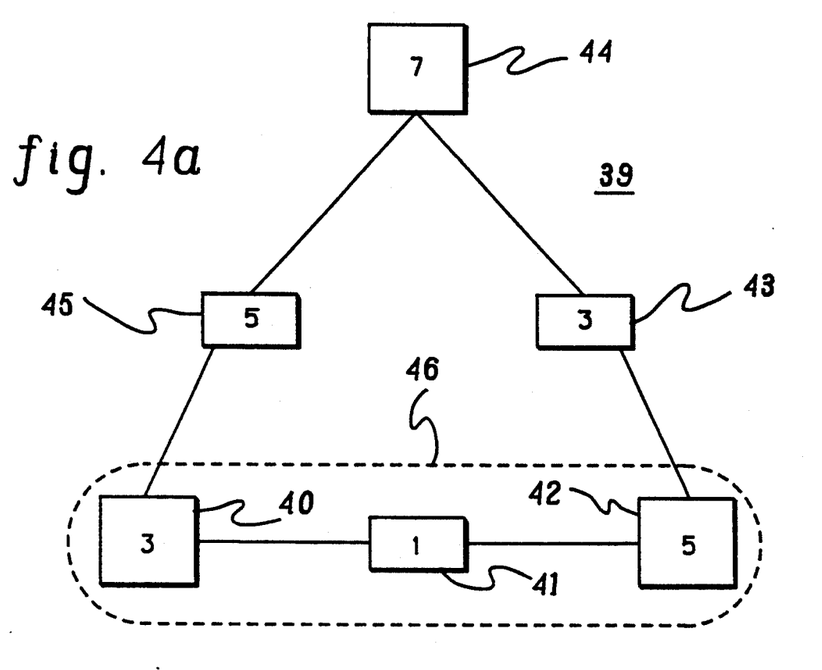
FIGS. 4a–4c depict a sample network wherein multiple alarms are sequentially considered for correlation and for identification of a responsible fault(s) pursuant to the present invention.
Figure 4B:
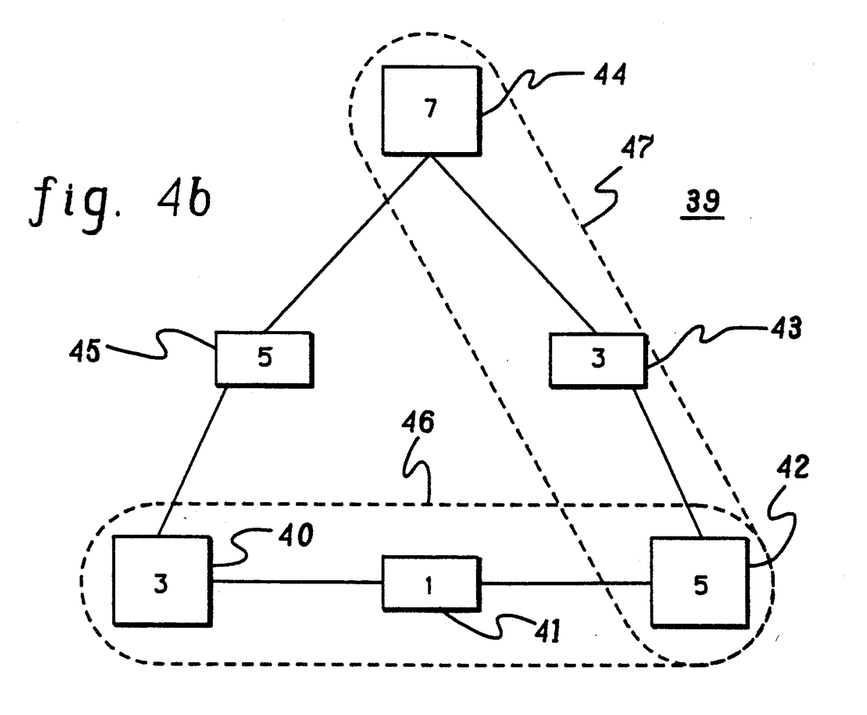
Figure 4C:
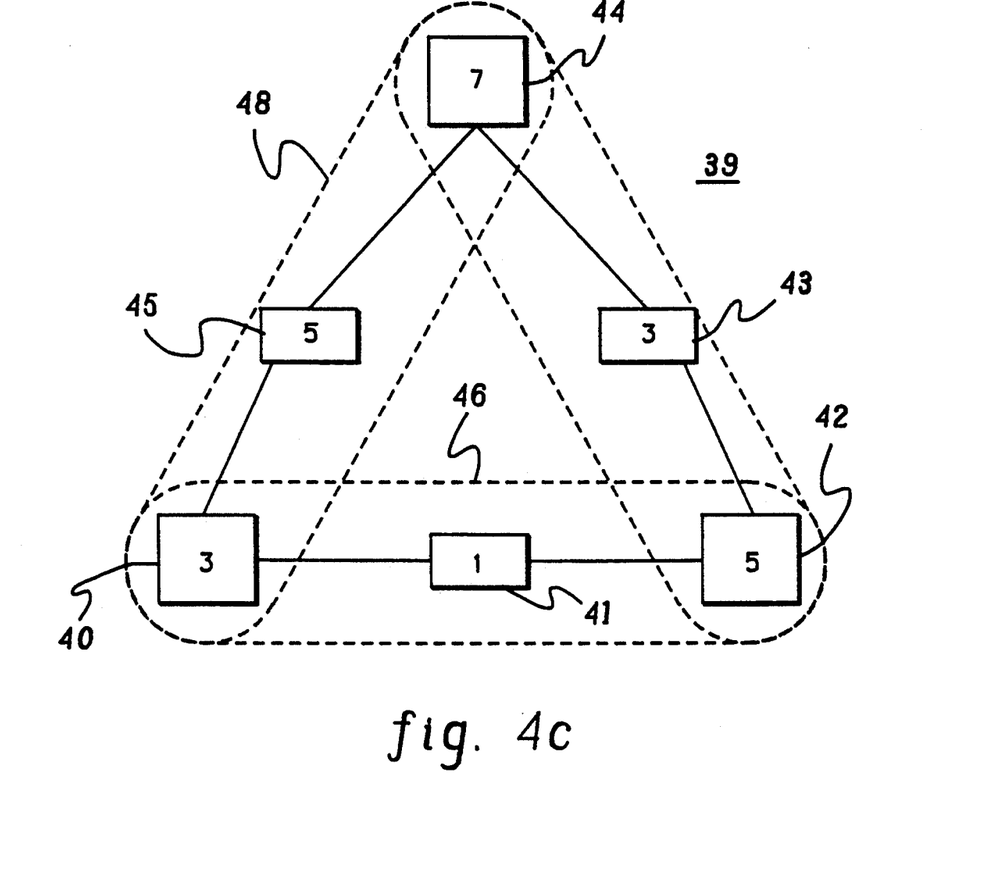

By way of an operational example, FIGS. 4a-4c depict a triangularly configured communications network, generally denoted 39, being monitored pursuant to the present invention. Network 39 includes a number of communication devices 40-45, each of which has a weight associated therewith as indicated. A first alarm indicates that devices 40, 41 and 42 (forming set 46) may be at fault (FIG. 4a). FIG. 3 directs that the weight of each set of incidents be minimized so that device 41 is initially selected as being at fault for the associated alarm. In FIG. 4b, a new alarm is received wherein devices 42, 43 and 44 comprise a set 47 of possible faults. The intersection of sets 46 and 47 indicates that device 42 is at fault for both alarms.

Once a third alarm is added having a possible fault set 48 (i.e., devices 44, 45 and 40) the solution becomes somewhat more complex (FIG. 4c). For example, while device 41 would account for set 46, a fault at device 44 would be necessary to account for sets 47 and 48. Alternatively, a fault at device 40 would account for alarms corresponding to sets 46 and 48, and a fault at device 43 would account for fault localization field 47. Given the algorithm of FIG. 3, this latter possibility comprises the selected solution. The algorithm does not guarantee absolute correct results, but rather presents the location of the devices most probably at fault for the alarms received.

Figure 5:
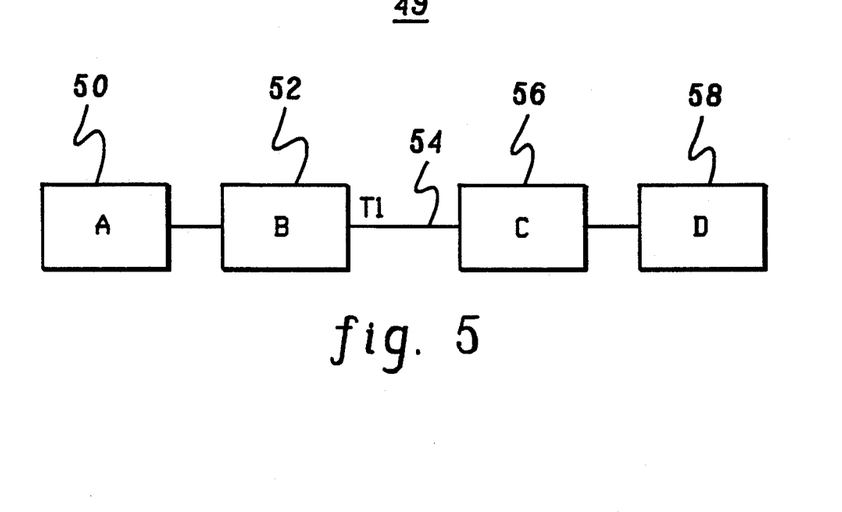
FIG. 5 depicts another sample network to be monitored using the present invention.

One difficulty with the second localization algorithm presented herein is described next with reference to a communication network 49 shown in FIG. 5. In this configuration, network 49 includes five devices or elements connected in series. Device A 50 is connected to device B 52, which is connected to T1 line 54, which is connected to device C 56, which is connected to device D 58. Thus, the topology can be represented as follows A-B-(T1)-C-D. Assume that a first alarm is received from device A stating that either device B, line T1, device C or device D is at fault. Assume further that a second alarm is received from device D stating that either device A, device B, line T1 or device C is at fault. Because connecting telecommunication lines are assumed to have the highest probability of failure, line T1 is identified as being the faulty device signalled by the first and second received alarms using the processing flow of FIG. 3. While the alarms are correlated correctly according to the algorithm, the identification of the fault is probably incorrect. Absence of alarms from device B and device C would indicate that the problem is not with line T1, but rather, most probably associated with a fault in the line which connects A to B, and/or the line which connects C to D. The algorithm presented in FIG. 3 cannot identify the correct cause of the problem in this example because the a-priori information needed is greater than the information used in the algorithm. This example highlights the fact that the absence of alarms is important information that should also be considered in the fault identification process.

The other case ignored by the second algorithm is the existence of unreliable alarms. Sometimes alarms are emitted because a threshold is exceeded, or some other transient condition has happened, which is not an indication of a permanent fault. Thus, alarms can be unreliable from the fault indication point of view, i.e., an investigation of a non-existent fault can be triggered.

In order to utilize the information that some alarms should have appeared but do not, it is necessary to know which alarms should appear given a particular fault. For the case of multiple faults, it is necessary to specify two types of information for each fault; namely, the alarms that the fault would trigger and the effect the fault may have on alarms emitted due to other faults. An assumption is made that this information can be obtained off-line by one skilled in the art. Obviously, the way to specify the information for each fault is dependent upon the system to be diagnosed and on the particular fault involved. Thus, a localization algorithm as set forth in FIG. 6 that best explains emitted alarms can be used (which again is to be read in connection with the overview processing of FIG. 1).

Figure 6:
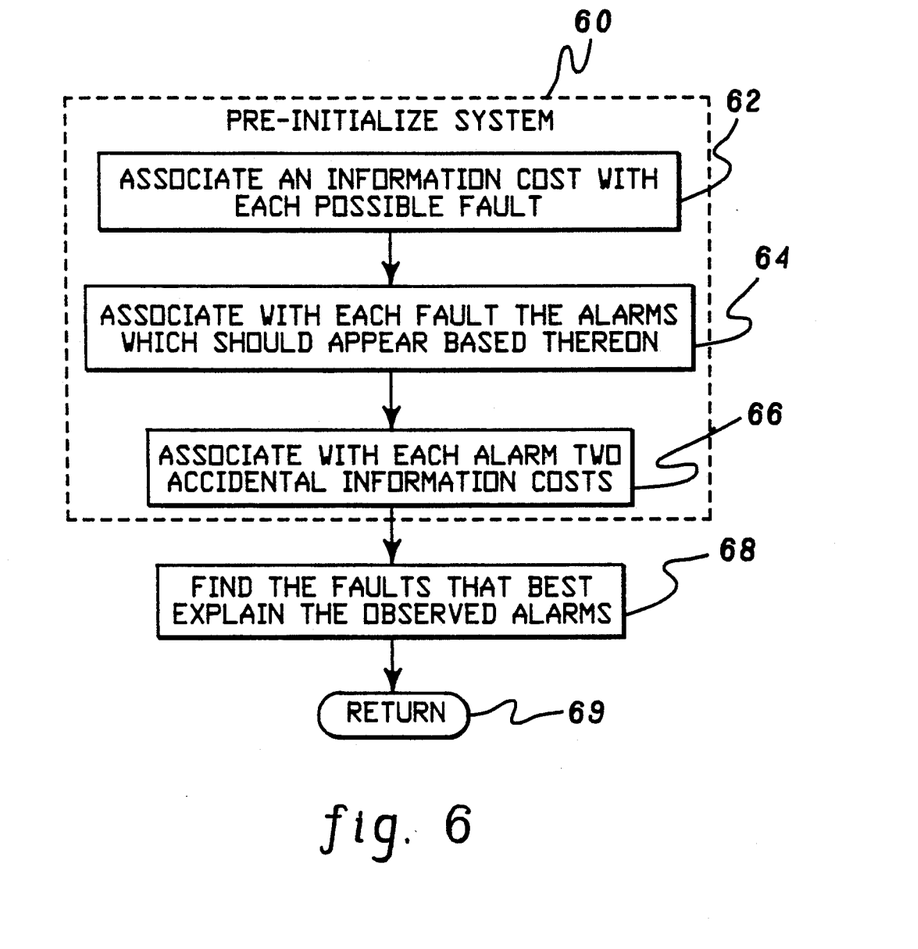
FIG. 6 is a functional diagram of a third localization algorithm embodiment for use in the processing flow of FIG. 1.

Off-line, pre-initialization of system functions 60 first includes associating an information cost with each possible fault as explained in connection with the algorithm of FIG. 3, 62 "Associate An Information Cost With Each Possible Fault." The cost corresponds to the probability that the particular fault shall occur. In addition, the alarms which should appear based on a given fault are identified, 64 "Associate With Each Fault The Alarms Which Should Appear Based Thereon." Also, two additional information costs are associated with each alarm, 66 "Associate With Each Alarm Two Accidental Information Costs." The first information cost depends on the probability that the particular alarm is accidentally lost and the second information cost depends on the probability that the alarm is accidentally emitted. Assuming the existence of this information, then after identifying all possible faults in the network to the degree required in the given communications network the faults that best explain the observed alarms are identified, 68 "Find The Faults That Best Explain The Observed Alarms."

The observed alarms are defined to include the alarms that should have been emitted due to the faults, plus the alarms that were accidentally emitted, minus the alarms that were accidentally lost. Again, this step seeks to obtain the best explanation for the alarms by minimizing the sum of the information costs of all the faults, and the information costs due to accidental loss and emission of alarms. As with step 36 of the processing flow of FIG. 3, step 68 in this approach is generally NP-Complete, thus a heuristic search in the space of the possible faults is the most likely practical implementation. After finding the faults which best explain the observed alarms, return is made to the processing flow of FIG. 1, 69 "Return."

Figure 7:
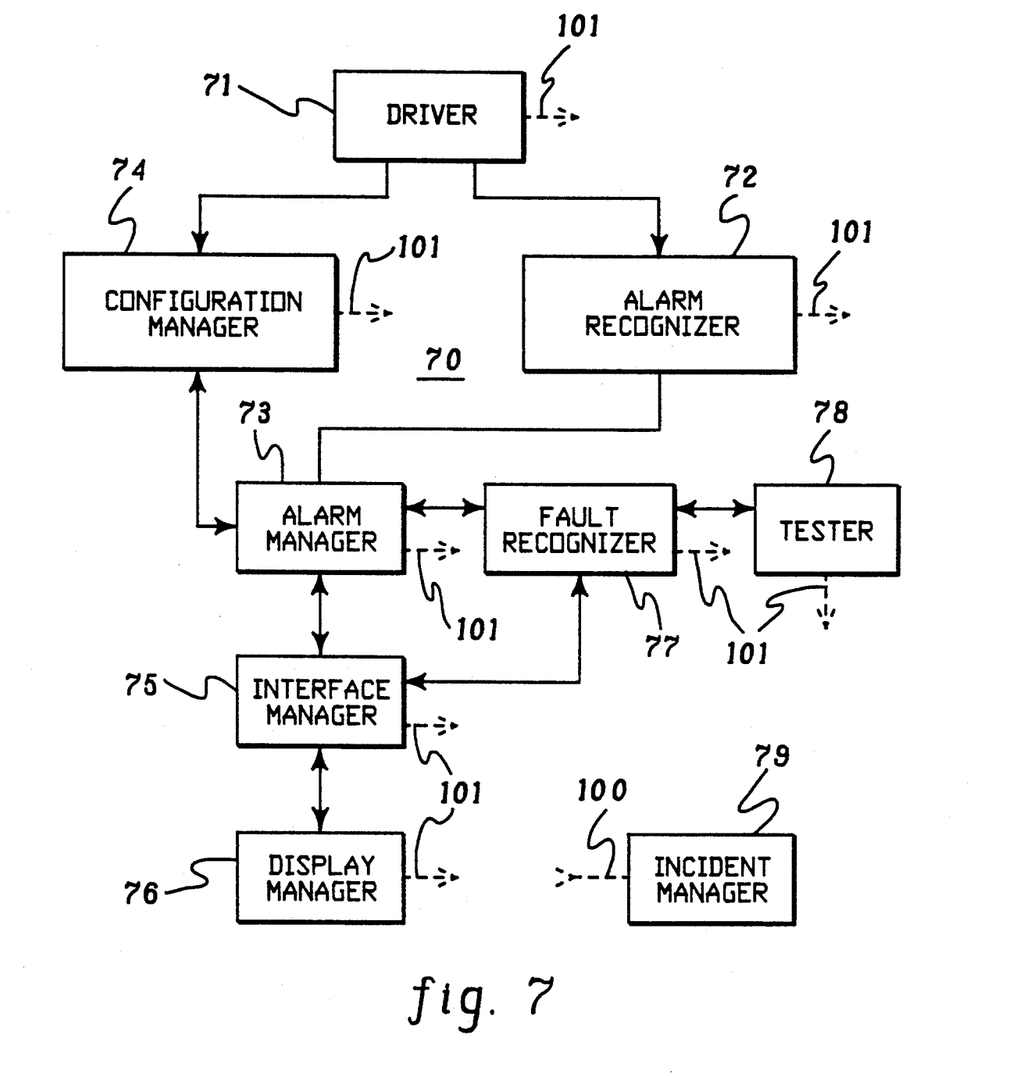
FIG. 7 depicts a block diagram representation of certain components in one alarm correlation and fault identification system pursuant to the present invention.

Certain function blocks or components of a software system 70 pursuant to the present invention are depicted in FIG. 7. Each component shown therein has a set of well defined interfaces by which communication with other components and/or human operators may take place. Once the interfaces have been fully specified, implementation of each component proceeds in an independent manner. The basic informational input to the system 70 is a stream of alarms. The alarms are processed by the system components to produce correlated alarms and fault localization information.

System 70 includes a driver 71 which dynamically provides the system with the set of alarms to be processed. In an on-line mode, driver 71 must collect the alarms from a service point or directly from the devices. The alarms are fed to an alarm recognizer 72 for recognition and translation into a usable internal format. The translation process results in the production of a normalized alarm. Again, alarms are normalized to contain fault localization information. A translation process is preferably table-based with each incoming alarm associated with a normalized alarm. Recognized alarms are forwarded through an agreed upon interface to an alarm manager 73 which processes the normalized inputs using the facilities of an incident manager 79. Incident manager 79 is coupled to each of the system components via phantom lines 100 and 101 shown in FIG. 7.

Manager 73 has the responsibility of performing both fault localization and alarm correlation. This is accomplished by referring to the system topology stored in a configuration manager 74. (Pursuant to the present invention faults may be identified notwithstanding on-line reconfiguration of the system.) Alarm manager 73 may also send information about a given incident to a fault recognizer 77 which may, using the facilities of incident manager 79, further update the incident. Fault recognizer 77 makes information about the updated incident available to an interface manager 75. Interface manager 75 has the responsibility of communicating information from alarm manager 73 to the outside application and/or the display manager 76. The interface manager might forward a request to display an incident to the display manager and to any applications which are interacting with the system. The interface manager works in lockstep with the display manager 76. The display manager presents information about incidents to network operators. It essentially manages a display screen. The display manager also receives input from human operators and sends the input to the interface manager 75.

A tester 78 is also connected to fault recognizer 77 for performing testing of devices on behalf of the fault recognizer. Device testing may include polling devices for further information or placing devices into a test mode. Incident manager 79 has the responsibility for managing an incident, which is represented by a data structure. An incident may be shared by several components at once and this manager has the responsibility for arbitrating this sharing. If the system is in standard mode, one request might be to perform fault recognition. In such a case, the interface manager 75 must pass information about the incident to the fault recognizer 77. Any time information about an incident is passed, the incident manager must be invoked. The output of the alarm manager is a new set of incidents indicating the probable fault locations. According to the first localization algorithm presented herein, the alarm manager constructs the minimum number of incidents such that all of the alarms associated with an incident share a common intersection, and all alarms are assigned to some incident.

Figure 8:
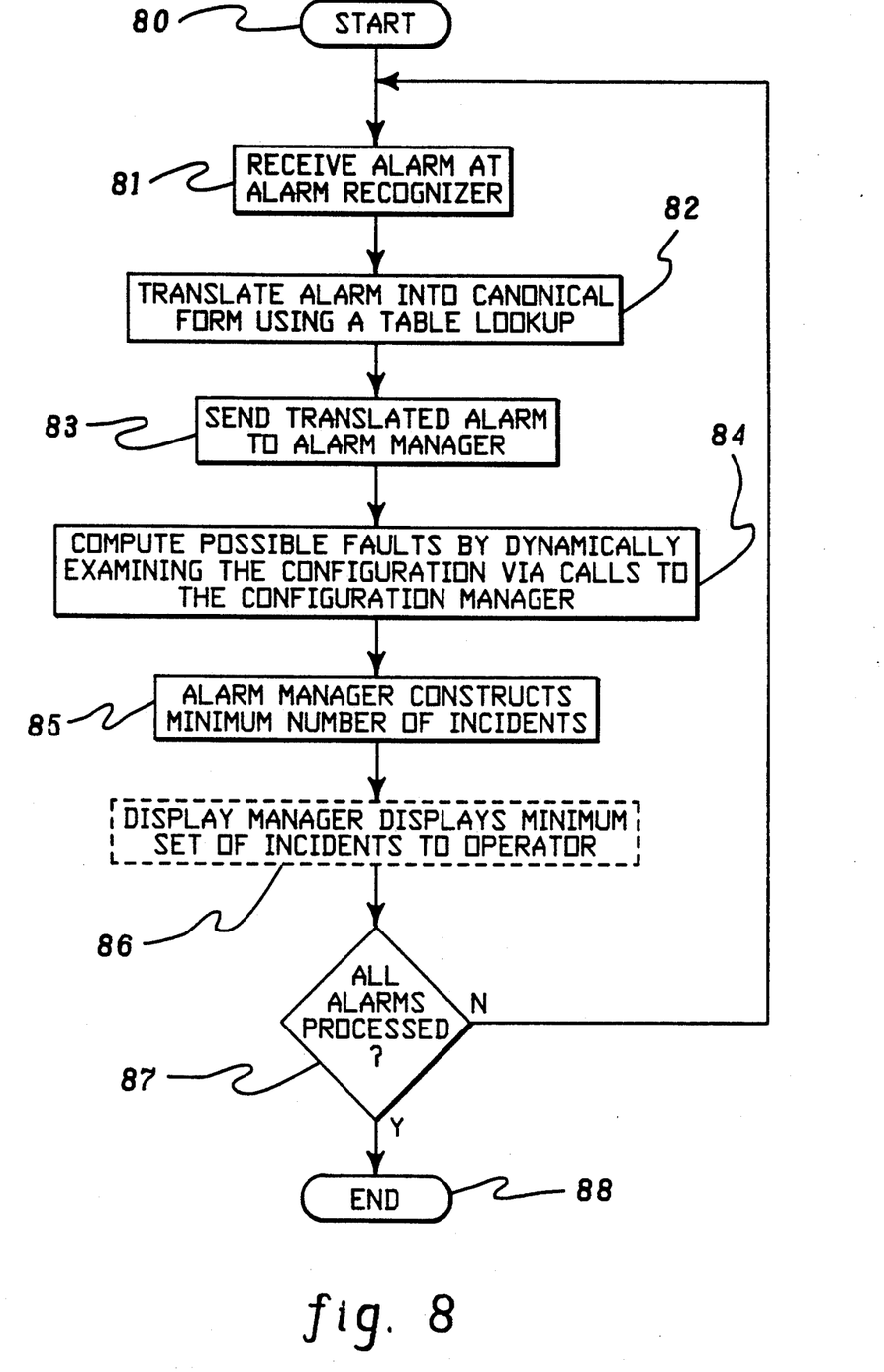
FIG. 8 is a functional overview of one standard processing technique pursuant to the present invention using the system components depicted in FIG. 7.

An overview of a standard processing technique using system 70 is shown in FIG. 8. At a time subsequent to system initialization, 80 "Start," an alarm is received at the alarm recognizer, 81 "Receive Alarm At Alarm Recognizer." This alarm is then translated into a canonical form using a table lookup. Again, one or more primitives, such as upstream, downstream, internal or external, may be associated with the translated alarm, 82 "Translate Alarm Into Canonical Form Using A Table Lookup." The normalized alarm is then sent to the alarm manager (i.e., manager 73 in FIG. 7), 83 "Send Translated Alarm to Alarm Manager," which computes the set of devices and connections in the network which are possible causes of the alarm, 84 "Compute Possible Faults By Dynamically Examining The Configuration Via Calls To The Configuration Manager." As noted, the list of devices is obtained by dynamically examining the configuration via calls to the configuration manager. The primitives upstream, downstream, internal and external are used to direct the search through the configuration.

The alarm manager next constructs the minimum number of incidents such that all the alarms associated with an incident share a common intersection and all alarms are assigned to some incident, 85 "Alarm Manager Constructs Minimum Number Of Incidents." This function essentially comprises the localization algorithm of FIG. 2. If desired the display manager could next display the minimum set of incidents to an operator, 86 "Display Manager Displays Minimum Set Of Incidents To Operator." Updating an associated display with each newly received alarm is optional. Inquiry is thereafter made as to whether all alarms have been processed, 87 "All Alarms Processed?" If additional alarms have been received, then return is made to instruction 81 "Receive Alarm At Alarm Recognizer." Alarm correlation and fault localization is completed once all alarms have been processed, 88 "End."

Those skilled in the art will recognize from the above description that generalized fault-identification and alarm-correlation methods and systems for networks (such as communication networks) have been presented. Most of the methods and systems are capable of identifying multiple simultaneous faults, in addition to introducing a natural separation of the expert knowledge (i.e., the fault locations indicated by each alarm) and the algorithms used, with an important contribution being alarm modeling and the presented processing algorithms. Further, processing approaches capable of handling unreliable alarms are presented and a method and system which can be easily adopted in a dynamic network (where new nodes and devices are added or removed from the network) are described.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. In a communications network having a plurality of devices connected therein, at least some of said devices responding to a perceived fault in said system by presenting an alarm, a method for identifying a fault in said communications network, said identifying method comprising the steps of:
   (a) identifying at least one activated alarm in said network, each said alarm being emitted by a corresponding one of said alarm emitting devices o connected within said communications network, and each said alarm indicating knowledge of the corresponding device state or the corresponding device interface state;
   (b) assigning to each identified alarm at least one primitive from a plurality of predefined primitives, each said assigned primitive indicating a relative fault location within the network with respect to the corresponding device;
   (c) mapping each said alarm with said at least one assigned primitive to a representative portion of said network, said portion corresponding to the relative fault location indicated by said at least one assigned primitive, wherein a set of possible faulted device locations is defined for each alarm; and
   (d) using the defined fault location set to determine a possible location of an actual fault in said network.

2. The fault identifying method of claim 1, wherein multiple activated alarms are identified in said network, and wherein said determining step (d) includes using the corresponding possible fault location sets to correlate at least some of said multiple activated alarms, said at least some correlated alarms comprising an incident, said incident being used in said step (d) to determine the location of said actual fault in said network.

3. The fault identifying method of claim 2, wherein said determining step (d) includes correlating multiple activated alarms into multiple incidents, said multiple incidents being used to determine the possible locations of multiple faults in said network.

4. The fault identifying method of claim 3, wherein said step (d) further includes constructing a minimum number of incidents such that all correlated alarms within an incident share a common intersection and such that all identified alarms are assigned to one of said incidents.

5. The fault identifying method of claim 1, wherein multiple faults in said communications network are possible and wherein said step (d) of said method identifies a most likely location for each of said faults in said network.

6. The fault identifying method of claim 5, further including the step of pre-associating each device connected in said communications network with a first information cost, each associated first information cost being dependent upon the likelihood of failure of said device.

7. The fault identifying method of claim 6, wherein multiple activated alarms are identified in said network, and wherein said determining step (d) includes correlating related alarms to define multiple sets of incidents, said step (d) further comprising associating with each defined incident a single possible device fault, the first information cost associated with the single possible device fault, and any alarm which contains the possible faulted device within its corresponding set of possible fault locations defined in said mapping step (c).

8. The fault identifying method of claim 7, wherein said determining step (d) includes identifying the most likely location of an actual fault in said network by defining the sets of incidents such that for each incident set the sum of the first information costs of the possible device faults within each incident is minimized and such that all alarms are associated with one of said incidents in said incident sets.

9. The fault identifying method of claim 8, wherein said determining step (d) includes identifying the fault contained within each alarm's fault localization field most probably occurring using said associated first information costs.

10. The fault identifying method of claim 6, further comprising pre-associating with each possible device fault in the communications network the alarms which should be presented upon faulting thereof.

11. The fault identifying method of claim 10, further comprising pre-associating with each alarm a second information cost dependent upon the probability that the particular alarm is accidentally lost and a third information cost dependent upon the probability that the alarm is accidentally emitted.

12. The fault identifying method of claim 11, wherein said determining step (d) further includes using each of said first information cost, second information cost, third information cost, and pre-associated alarms which should be presented to identify the possible actual faults which best explain the identified alarms.

13. The fault identifying method of claim 1, wherein said plurality of predefined primitives includes an upstream primitive, a downstream primitive, and an interface primitive, said upstream primitive indicating that an actual fault is located in a communications layer above the communications layer of the device emitting the alarm, said downstream primitive indicating that an actual fault is located in a communications layer below the communications layer of the device emitting the alarm, and said interface primitive indicating whether the fault is in the interface to the device emitting the alarm.

14. The fault identifying method of claim 1, further comprising the step of displaying the possible location of an actual fault in said network.

15. A system for identifying a fault in a communications network having a plurality of devices connected therein, at least some of said devices responding to a perceived fault in said system by presenting an alarm, said system comprising:
   means for identifying multiple activated alarms in said network, each said alarm being emitted by a corresponding one of said alarm emitting devices connected within said communications network, and each alarm indicating knowledge of the corresponding device state or the corresponding device interface state:
   means for assigning to each identified alarm at least one primitive from a plurality of predefined primitives, each assigned primitive indicating a relative fault location within the network with respect to the corresponding device;
   means for mapping each alarm with its assigned primitive to a representative portion of said network, said representative portion corresponding to the relative fault location indicated by said at least one assigned primitive, wherein a set of possible fault locations is defined for each alarm; and means for determining a possible location of an actual fault in said network using said defined fault location sets produced by said mapping means.

16. The identifying system of claim 15, wherein said system is capable of identifying multiple faults within said communications network, and wherein said determining means includes means for determining possible locations for each fault in said network using said predefined fault location sets produced by said mapping means.

17. The identifying system of claim 15, wherein said determining means includes means for correlating multiple activated alarms into multiple incidents, said multiple incidents being used to determine the possible locations of said actual fault in said network, said determining means further including means for constructing a minimum number of incidents such that all correlated alarms within an incident share a common intersection and such that all identified alarms are assigned to one of said incidents.

18. The identifying system of claim 17, wherein said determining means includes means for determining a possible location of an actual fault in said network through consideration of the proportional likelihood of failure of each of said devices within said network.

19. The identifying system of claim 15, further comprising display means for presenting to an operator said possible location of an actual fault in said network.

20. A system for identifying a fault in a communications network having a plurality of devices connected therein, at least some of said devices responding to a perceived fault in said system by presenting an alarm, said fault identifying system comprising:

an alarm recognizer for recognizing each device presented alarm and translating said alarm into a normalized form, said normalized alarm form including a relative indication of the fault location within the network with respect to the corresponding device; and an alarm manager coupled to said alarm recognizer for receiving said normalized alarms, said alarm manager having access to the topology of said communications network for producing a set of possible fault locations for each normalized alarm, said alarm manager further including means for determining a possible location of an actual fault in said network using said defined fault location sets.

21. The fault identifying system of claim 20, wherein multiple activated alarms are identified in said network, and wherein said alarm manager uses the corresponding possible fault location sets to correlate at least some of said multiple activated alarms, each grouping of said correlated alarms comprising an incident, said alarm manager using said incidents to determine the location of said actual fault in said network.

22. The fault identifying method of claim 21, wherein said alarm manager includes means for constructing a minimum number of incidents such that all correlated alarms within an incident share a common intersection and such that all identified alarms are assigned to one of said incidents.

* * * * *

UNITED STATES PATENT AND TRADEMARK OFFICE
CERTIFICATE OF CORRECTION

PATENT NO. : 5,309,448
DATED : May 3, 1994
INVENTOR(S) : Bouloutas et al.

It is certified that error appears in the above-indentified patent and that said Letters Patent is hereby corrected as shown below:

Column 1, line 8, delete "method" and substitute --methods--.
Column 3, line 56, delete "who" and substitute --Who--.

Column 11, line 13 between "devices" and "con-" delete --o--.

Signed and Sealed this

Thirtieth Day of August, 1994

Attest:

BRUCE LEHMAN

*Attesting Officer*     *Commissioner of Patents and Trademarks*